UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

ARC-LIGHT ELECTRODE.

1,039,522.  Specification of Letters Patent.  Patented Sept. 24, 1912.

No Drawing.  Application filed May 22, 1911. Serial No. 628,634.

*To all whom it may concern:*

Be it known that I, EMILE J. GUAY, a citizen of the United States, residing at Lynn, in the county of Essex, State of Massachusetts, have invented certain new and useful Improvements in Arc-Light Electrodes, of which the following is a specification.

My invention has reference to an electrode of the flaming or luminous type, in which the chief light giving constituent is titanium carbid or other titanium compound.

In flaming or luminous arcs, as is well known, most of the light is emitted by the arc itself as distinguished from the incandescent crater or tip, as is the case with carbon electrodes. Any unsteadiness in such an arc is accordingly attended by a corresponding variation in the light emitted thereby. Now, titanium carbid, which is one of the most efficient light giving materials, produces at the same time an arc which is particularly unsteady. Its melting point is high, higher in fact than the vaporizing point, with the consequence that the arc springs from a small spot which jumps about irregularly on the arcing surface of the electrode, driving the arc in different directions and thus producing an unsteadiness in the arc. This movement of the arc is at times so rapid that the arc collapses altogether and causes a premature feeding operation of the lamp. This unsteadiness of the arc is accentuated by the fact that a titanium carbid arc is long and thin and runs at a high temperature. I have overcome this unsteady tendency in an arc in which titanium carbid is the principal light giving constituent by incorporating with the titanium carbid other materials which form a pool relatively larger than the spot from which the titanium carbid arc springs, and at the same time fattens or enlarges the arc, both of which features exert a steady influence thereon.

Specifically my electrode is composed of titanium carbid, cerium fluorid, cerium tungstate, cryolite and carbon. The cryolite possesses a low melting point and a high boiling point and forms a liquid pool on the tip of the electrode into which the other constituents of the electrode enter and from which their vapors pass into the arc. Of course these constituents, the cerium fluorid makes the arc larger and cooler than a titanium carbid arc and is at the same time a fairly efficient light producing material. This constituent is not, however, suitable for the purposes of my invention in the absence of the cryolite, since in that case it would volatilize in the electrode before it enters into the arc. The cerium tungstate gives a fair amount of light but is particularly valuable as a restrainer, giving the electrode a considerably longer life than it would otherwise have. Carbon is added to the electrode to give conductivity to the pool in its congealed condition. In the absence of the carbon, difficulty is at times experienced in striking the arc, as the pool containing the constituents of the electrode other than carbon is non-conducting when cold and thus the arc is not always properly established on separation of the electrodes. The carbon becomes disseminated in the liquid pool and gives conductivity thereto even when it is cool, thus insuring the proper establishment of the arc on the separation of the electrodes. The carbon is also valuable in giving conductivity to the electrode itself.

An electrode made in accordance with the above description gives a very efficient white light. In case a yellow light is desired, the cerium tungstate may be dispensed with, but in that case a larger proportion of cryolite is necessary, for instance 12 or 15 parts, whereas about 5 parts are sufficient in the first case.

I have made an excellent electrode by making a paste of the constituents, squirting the same and baking the sticks thus formed. The electrode thus formed may be coated with carbon by painting with tar or any suitable carbonizable material. I have also made a good electrode by squirting the constituents into a carbon shell. It will be understood, however, that the particular method of making the electrode forms no part of my invention.

I have made an excellent electrode with the constituents in the following proportions: titanium carbid 25%; cerium fluorid 20%; cerium tungstate 15%; cryolite 5%; and carbon 35%. These constituents may, however, be varied and still produce a useful and efficient electrode. Thus, for instance, good electrodes result from the use of titanium carbid from 20 to 30 parts; cerium fluorid 15 to 25 parts; cerium tungstate from 12 to 18 parts; carbon 30 to 35 parts; cryolite 5 parts. The cryolite should not vary substantially from the percentage above indicated.

While I have described my invention as particularly applicable to an electrode in which titanium carbid is present, it is to be understood that I am not limited to titanium carbid, as I have found that titanium suboxid together with the other constituents produces an excellent electrode.

What I claim as new and desire to secure by Letters Patent of the United States, is:—

1. An arc light electrode composed of titanium carbid, cerium fluorid, cerium tungstate, carbon, and cryolite to the amount of substantially 5% of the total mass of the electrode.

2. An arc light electrode composed of titanium carbid, from 20 to 30 parts; cerium fluorid 15 to 25 parts; cerium tungstate 12 to 18 parts; cryolite substantially 5 parts; carbon 30 to 35 parts.

3. An arc light electrode composed of the following constituents in substantially the proportions indicated: titanium carbid 25%; cerium fluorid 20%; cerium tungstate 15%; cryolite 5%; carbon 35%.

4. An arc light electrode containing a titanium compound, cerium fluorid, cryolite and carbon.

5. An arc electrode containing titanium carbid, cerium fluorid, cryolite and carbon.

In witness whereof I have hereunto set my hand this 18th day of May, 1911.

EMILE J. GUAY.

Witnesses:
JOHN A. McMANUS, Jr.,
CHARLES A. BARNARD.